US010027516B2

(12) United States Patent
Dong

(10) Patent No.: US 10,027,516 B2
(45) Date of Patent: *Jul. 17, 2018

(54) RECEIVER WITH OFFSET CALIBRATION

(71) Applicant: Rambus Inc., Sunnyvale, CA (US)

(72) Inventor: Yikui Jen Dong, Cupertino, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/582,182

(22) Filed: Apr. 28, 2017

(65) Prior Publication Data

US 2017/0331648 A1 Nov. 16, 2017

Related U.S. Application Data

(63) Continuation of application No. 14/942,929, filed on Nov. 16, 2015, now Pat. No. 9,674,009.

(60) Provisional application No. 62/094,832, filed on Dec. 19, 2014.

(51) Int. Cl.
| | |
|---|---|
| *H03H 7/30* | (2006.01) |
| *H04L 25/03* | (2006.01) |
| *H04B 1/16* | (2006.01) |
| *H04B 10/69* | (2013.01) |
| *H04L 25/02* | (2006.01) |

(52) U.S. Cl.
CPC ......... *H04L 25/03057* (2013.01); *H04B 1/16* (2013.01); *H04L 25/0272* (2013.01); *H04B 10/69* (2013.01); *H04B 10/695* (2013.01); *H04L 25/0292* (2013.01)

(58) Field of Classification Search
CPC ... H04B 10/69; H04B 10/695; H04L 25/0272; H04L 25/0292; H04L 25/0296

USPC .......... 375/219, 222, 257, 316, 346
See application file for complete search history.

(56) References Cited

U.S. PATENT DOCUMENTS

| | | |
|---|---|---|
| 6,735,260 B1 | 5/2004 | Eliezer et al. |
| 7,099,400 B2 | 8/2006 | Yang et al. |
| 7,248,640 B2 | 7/2007 | Gorecki et al. |
| 7,616,700 B2 | 11/2009 | Kim et al. |
| 8,199,866 B2 | 6/2012 | Fuller et al. |

(Continued)

OTHER PUBLICATIONS

Gangasani, Gautam et al., "28Gb/s 560mW Multi-Standard SerDes with Single-Stage Analog Front-End and 14-Tap Decision-Feedback Equalizer in 28nm CMOS", IEEE Journal of Solid-State Circuits, vol. 47, No. 8, pp. 1828-1841, Aug. 2012. 14 pages.

(Continued)

*Primary Examiner* — Leila Malek
(74) *Attorney, Agent, or Firm* — Fenwick & West LLP

(57) ABSTRACT

An on-chip AC coupled receiver with offset calibration. The receiver includes AC coupling circuitry to couple a differential input signal into a coupled differential signal having a first signal and a second signal. The receiver includes a first comparator to generate a first error signal indicative of whether a first reference signal is greater or smaller than a signal derived from the coupled differential signal. The receiver includes a second comparator to generate a second error signal indicative of whether a second reference signal is greater or smaller than the signal derived from the coupled differential signal. The receiver further includes feedback circuitry to adjust a voltage offset between the first signal and the second signal of the coupled differential signal based on the first error signal and the second error signal.

20 Claims, 9 Drawing Sheets

(56) References Cited

U.S. PATENT DOCUMENTS

| | | | |
|---|---|---|---|
| 8,249,207 B1 | 8/2012 | Hissen et al. | |
| 8,335,249 B1 | 12/2012 | Su et al. | |
| 8,750,406 B2 | 6/2014 | Pan et al. | |
| 2003/0035497 A1 | 2/2003 | Gorecki et al. | |
| 2008/0157846 A1 | 7/2008 | Liu et al. | |
| 2009/0067545 A1 | 3/2009 | Chu | |
| 2010/0117706 A1 | 5/2010 | Stojanovic et al. | |
| 2012/0119790 A1* | 5/2012 | Chen | H03K 3/356139 327/65 |
| 2012/0201289 A1 | 8/2012 | Abdalla et al. | |
| 2013/0128943 A1 | 5/2013 | Doron et al. | |
| 2013/0195155 A1 | 8/2013 | Pan et al. | |
| 2013/0241622 A1 | 9/2013 | Zerbe et al. | |
| 2013/0308694 A1* | 11/2013 | Amamiya | H04B 7/005 375/233 |
| 2014/0036977 A1 | 2/2014 | Bucher et al. | |
| 2014/0169440 A1* | 6/2014 | Kotagiri | H04L 25/063 375/233 |

OTHER PUBLICATIONS

Gangasani, Gautam R. et al., "A 16Gb/s Backplane Transceiver With 12-Tap Current Integrating DFE and Dynamic Adaptation of Voltage Offset and Timing Drifts in 45-nm SOI CMOS Technology", IEEE Journal of Solid-State Circuits, vol. 47, No. 8, pp. 1828-1841, Aug. 2012. 14 pages.

Kimura, Hiroshi et al., "28Gb/s 560mW Multi-Standard SerDes with Single-Stage Analog Front-End and 14-Tap Decision-Feedback Equalizer in 28 nm CMOS", 2014 IEEE International Solid-State Circuits Conference, ISSCC 2014, Session 2, pp. 38-40. 3 pages.

\* cited by examiner

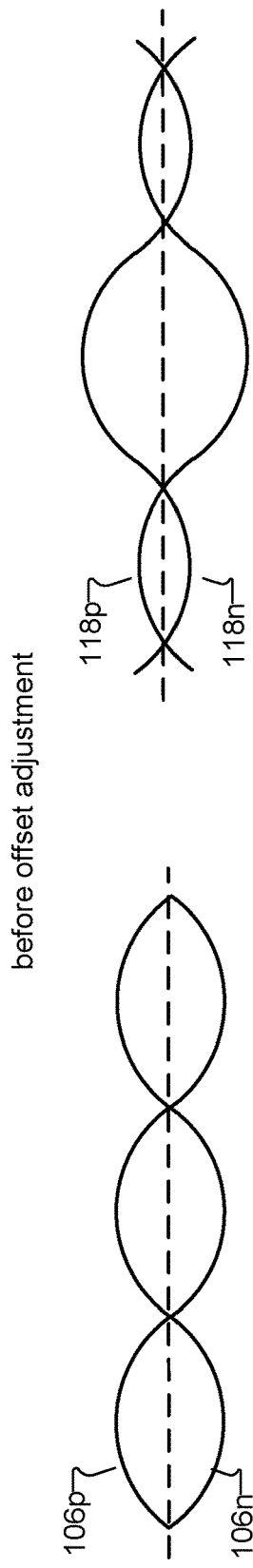
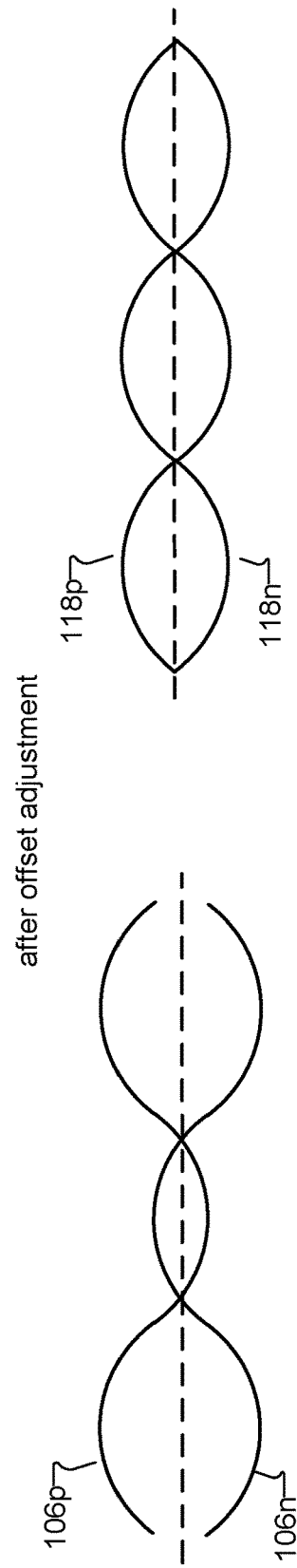
FIG. 3A — before offset adjustment
FIG. 3B — after offset adjustment

RECEIVER WITH OFFSET CALIBRATION

CROSS REFERENCE TO RELATED APPLICATIONS

This application is a continuation of U.S. patent application Ser. No. 14/942,929, filed on Nov. 16, 2015, which claims priority from U.S. Provisional Patent Application No. 62/094,832, titled "Receiver With Offset Calibration" and filed on Dec. 19, 2014, the contents of which are all incorporated by reference in their entirety.

BACKGROUND

In high speed data transmission systems, differential signaling is used to carry data from a transmitter to a receiver. Different components within the receiver can introduce voltage offsets between the positive and negative portions of the differential signal. These unwanted voltage offsets can affect the ability to the receiver to correctly recover data from the differential signal.

BRIEF DESCRIPTION OF THE DRAWINGS

The teachings of the embodiments herein can be readily understood by considering the following detailed description in conjunction with the accompanying drawings.

FIG. 3A is a waveform illustrating a coupled differential input signal before calibration, according to an embodiment of the present disclosure.

FIG. 3B is a waveform illustrated a coupled differential input signal after calibration, according to an embodiment of the present disclosure.

DETAILED DESCRIPTION OF EMBODIMENTS

Reference will now be made in detail to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

Embodiments of the present disclosure relate to an on-chip AC coupled receiver with offset calibration. The receiver includes AC coupling circuitry to couple a differential input signal into a coupled differential signal having a first signal and a second signal. The receiver includes a first comparator to generate a first error signal indicative of whether a first reference signal is greater or smaller than a signal derived from the coupled differential signal. The receiver includes a second comparator to generate a second error signal indicative of whether a second reference signal is greater or smaller than the signal derived from the coupled differential signal. The receiver further includes feedback circuitry to adjust a voltage offset between the first signal and the second signal of the coupled differential signal based on the first error signal and the second error signal.

The feedback circuitry adjusts the voltage offset using clocked adaptive feedback running continuously to compensate for any inherent and changing offsets within the receiver. In other embodiments, the feedback circuitry may also control the gain of preconditioning circuitry, as well as the voltage levels of the first and second reference signals. In other embodiments, the feedback circuitry may also use the recovered data in adjusting the voltage offset.

In one embodiment, a non-transitory computer readable medium storing a representation of the receiver is disclosed. In another embodiment, a method of operation in the receiver is disclosed.

Figure 1:
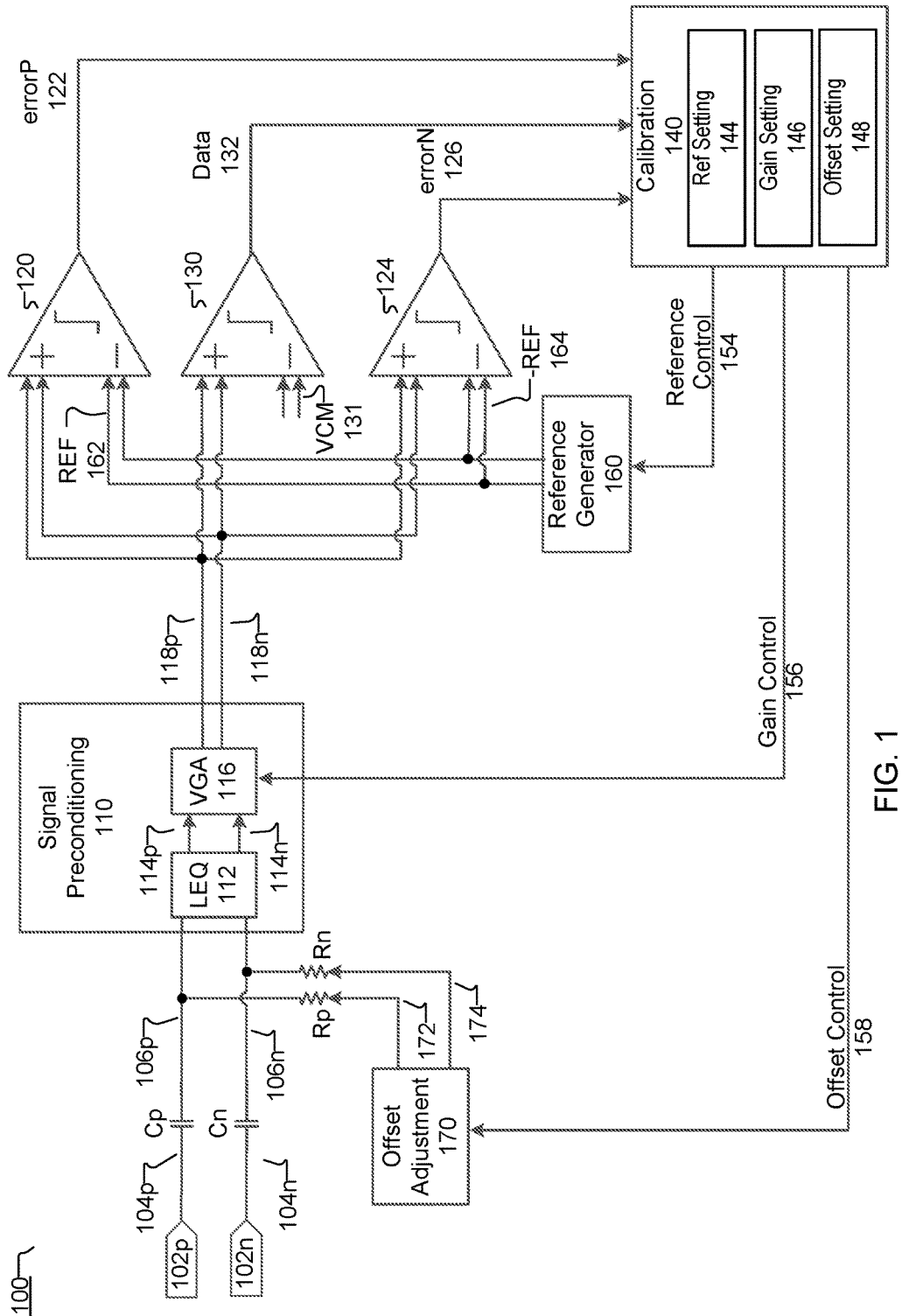
FIG. 1 is an on-chip AC coupled receiver with offset calibration, according to an embodiment of the present disclosure.

FIG. 1 is an on-chip AC coupled receiver with offset calibration, according to an embodiment of the present disclosure. The receiver 100 may be found on-chip in an integrated circuit (IC). The receiver 100 receives a differential input signal 104 (having positive 104$p$ and negative 104$n$ signals) from a remote transmitter via a serial communication channel, and converts the differential input signal 104 into digital data 132. The receiver 100 includes input terminals 102, AC coupling capacitors Cp and Cn, a signal preconditioning circuit 110, error comparators 120 and 124, data decision circuit 130, a calibration circuit 140, a reference generator 160, an offset adjustment circuit 170, and feedback resistors Rp and Rn.

The input terminals 102 are coupled to a differential communication channel and receive a differential signal 104 (comprised of 104$p$ and 104$n$) from the channel. The differential input signal 104 includes a pair of signals: positive input signal 104$p$ and a negative input signal 104$n$. Positive input terminal 102$p$ receives positive input signal 104$p$. Negative input terminal 102$n$ receives negative input signal 104$n$.

AC coupling capacitors Cp and Cn perform AC coupling on the differential input signal 104 to remove DC components of the differential input signal 104. The AC components of the differential input signal 104 are passed through the coupling capacitors Cp and Cn and form coupled differential input signal 106 (comprised of 106$p$ and 106$n$). Positive coupling capacitor Cp AC couples positive input signal 104$p$ into coupled positive input signal 106$p$ at a signal node. Negative coupling capacitor Cn AC couples negative input signal 104$n$ into coupled negative input signal 106$n$ at another signal node. AC coupling capacitors Cp and Cn have the same capacitance values and are examples of AC coupling circuitry Offset adjustment circuit 170 adjusts a DC voltage offset between the positive coupled input signal 106$p$ and the negative coupled input signal 106$n$. The voltage offset adjustment causes an average voltage of the positive coupled input signal 106p and the average voltage of the negative coupled input signal 106n to be adjusted relative to each other. The exact amount of the voltage offset is controlled by offset control signal 148.

Offset adjustment circuit 170 includes two voltage outputs 172 and 174 that are connected to the coupled input signals 106p and 106n through high impedance resistors Rp and Rn. Resistors Rp and Rn have high impedance, for example 150 kohm, which prevents voltage glitches from being propagated from the offset adjustment circuit 170 onto the coupled differential input signal 106. The offset adjustment circuit 170 can adjust the voltage difference between DC voltages at its outputs 172 and 174, which affects the offset of coupled input signals 106p and 106n via resistors Rp and Rn.

In one embodiment, resistors Rp and Rn can represent any resistive element having a substantially high impedance, such a transistor connected as a high impedance resistor. In some embodiments, Rp and Rn may be considered to be part of offset adjustment circuit 170.

Signal preconditioning circuit 110 is an analog front end (AFE) portion of the receiver 100. Signal preconditioning circuit 110 applies analog signal processing to the coupled differential input signal 106 to generate a conditioned differential signal 118 at output nodes of the signal preconditioning circuit 110. Signal preconditioning circuit 110 includes a linear equalizer (LEQ) 112 that equalizes the coupled differential input signal using a linear filter, thereby generating equalized differential signal 114 (comprised of 114p and 114n). Variable gain amplifier (VGA) 116 amplifies the equalized differential signal 114, thereby generating conditioned differential signal 118 (comprised of 118p and 118n). The VGA 116 has an adjustable gain that is controlled with the gain control signal 146.

Conditioned differential signal 118 is one example of a signal derived from the coupled differential input signal 106. In other embodiments, signal preconditioning circuit 110 may also have other circuits, such as a buffer or a loopback multiplexer coupled to the output of the VGA 116.

Data decision circuit 130 makes a decision on the data represented by conditioned differential signal 118, thereby generating recovered data symbols 132. Data decision circuit 130 may also be referred to as a data slicer. The recovered data 132 may be single bit non-return to zero (NRZ) data. The recovered data 132 is passed on to other circuit stages (not shown) that use the recovered data 132. Data decision circuit 130 can be implemented with a differential comparator that receives conditioned differential signal 118 and a common mode voltage reference 131 (VCM) of the conditioned differential signal 118 as inputs, compares the two inputs, and generates an output signal indicating whether a differential voltage level represented by conditioned differential signal 118 is higher or lower than common mode voltage reference 131.

Error comparator 120 compares the conditioned differential input signal 118 to a positive differential reference signal 162 (REF). Error comparator 120 outputs an error signal 122 (errorP) indicating whether the differential voltage level of conditioned differential signal 118 is greater than or less than the differential voltage level of differential reference signal 162. For example, error signal 122 can include a binary value of 1 or 0 depending on the comparison.

Error comparator 124 compares the conditioned differential input signal 118 to a negative differential reference signal 164 (−REF). Differential reference signal 164 has opposite polarity from difference reference signal 162 because the positive and negative signals of differential reference signal 164 are reversed when compared to the positive and negative signals of differential reference signal 162. Error comparator 124 outputs an error signal 126 (errorN) indicating whether the differential voltage level of conditioned differential signal 118 is greater than or less than the differential voltage level of differential reference signal 164. For example, error signal 126 can include a binary value of 1 or 0 depending on the comparison.

Reference generator 160 generates the differential reference signals 162 and 164. The differential voltage level of the differential reference signals 162 and 164 is controlled by the reference control signal 144. In one embodiment, reference generator 150 is a digital to analog converter (DAC) that converts digital information in the reference control signal 144 into analog voltages that serve as differential reference signals 162 and 164.

Calibration circuit 140 receives error signal 122, error signal 126, and recovered data 132 as inputs. Calibration circuit 140 uses these signal inputs to adjust a reference setting 144 for the differential reference signals 162 and 164, a gain setting 146 for the gain of the VGA 116, and an offset setting 148 for the voltage offset between the coupled differential input signals 106n and 106p. Each of the settings can take on multiple values. For example, reference setting 144 can have 64 possible settings, gain setting 146 can have 9 possible values, and offset setting 148 can have 64 possible values.

Calibration circuit 140 generates one or more reference control signals 154 using the reference setting 144. The reference control signals 154 are used by the reference generator 160 for controlling the level of the differential reference signals 162 and 164. Reference control signals 154 may be analog or digital signals indicating a value of the reference setting 144.

The calibration circuit 140 generates one or more gain control signals 156 using the gain setting 146. The gain control signals 156 are used by the VGA 116 to control a gain of the VGA 116. Gain control signals 156 may be analog or digital signals indicating a value of the gain setting 146.

The calibration circuit 140 generates one or more offset control signals 158 using the offset setting 148. The offset control signals 158 are used by the offset adjustment circuit 170 to adjust a voltage offset between the coupled differential input signals 106n and 106p. Offset control signals 158 may be analog or digital signals indicating a value of the gain setting 148.

Calibration circuit 140, reference generator 160 and offset adjustment circuit 170 thus form a feedback loop circuitry for adjusting a voltage offset, gain, and reference levels of the receiver 100. The feedback loop circuitry allows for continuous adjustments during operation of the receiver 100 to account for variations in temperature and other operating conditions. Additionally, as the VGA 116 can have an inherent offset between its inputs that changes as the gain of the VGA 116 changes, the voltage offset of the coupled differential input signal 106 can be adjusted to account for this inherent offset.

Figure 2:
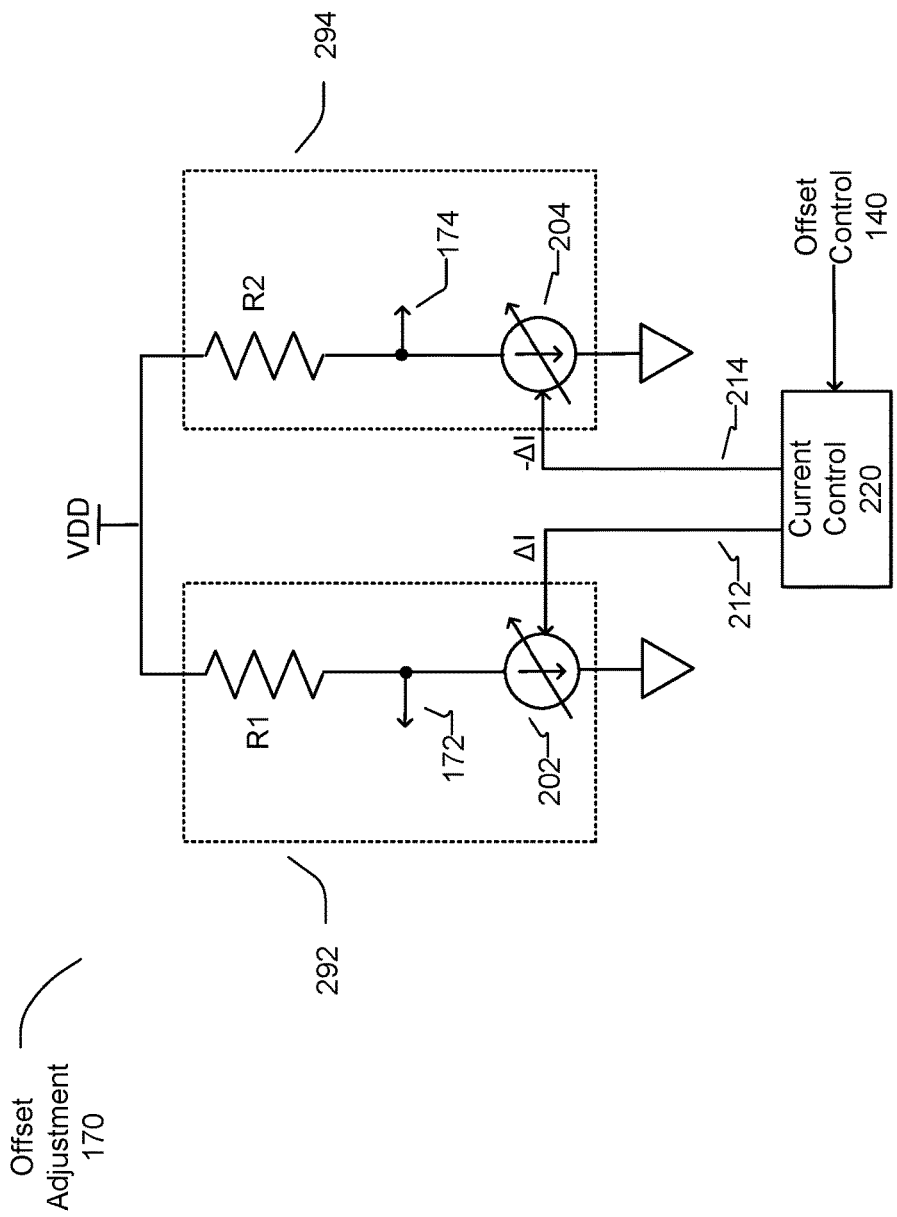
FIG. 2 is an offset control circuit from the receiver of FIG. 1, according to an embodiment of the present disclosure.

FIG. 2 is an offset adjustment circuit from the receiver of FIG. 1, according to an embodiment of the present disclosure. Offset adjustment circuit 170 includes an adjustable voltage generator 292 comprised of a pull up resistor R1 connected to a supply voltage VDD and a current source 202. The current generated by current source 202 flows through resistor R1 to generate an output voltage 172. Offset adjustment circuit 170 also includes a second adjustable voltage generator 294 comprised of a pull up resistor R2 connected to a supply voltage VDD and a current source 204. The current generated by current source 204 flows through resistor R2 generates an output voltage 174. R1 and R2 have a low impedance relative to Rp and Rn from FIG. 1. For example, R1 an R2 can each have an impedance of 2 kohm.

Current control circuit 220 receives the offset control signal 140 and generates two separate current control signals 212 and 214 for controlling the currents of the current source 202 and 204 in opposite directions. As the offset setting increases, current control circuit 220 causes one current source 202 to increase its current while causing the other current source 204 to decrease its current. This causes output voltage 172 to decrease while output voltage 174 increases, thereby increasing the voltage offset between output voltage 172 and output voltage 174. Conversely, as the offset setting decreases, current control circuit 220 causes one current source 202 to decrease its current while causing the other current source 204 to increase its current.

FIG. 3A includes waveforms of a coupled differential input signal 106 and conditioned differential input signal 118 before calibration, according to an embodiment of the present disclosure. The left waveform includes both a positive coupled input signal 106p and a negative coupled input signal 106n. The right waveform includes both a positive conditioned differential input signal 118p and a negative conditioned differential input signal 118n. Positive conditioned differential input signal 118p and a negative conditioned differential input signal 118n are offset from each other due to the inherent offset of components within the signal preconditioning circuit 110.

FIG. 3B includes waveforms of a coupled differential input signal 106 and conditioned differential input signal 118 after calibration, according to an embodiment of the present disclosure. The left waveform includes both a positive coupled input signal 106p and a negative coupled input signal 106n. Now a DC voltage offset has been added to the positive coupled input signal 106p, which increases an average voltage level of the positive coupled input signal 106p relative to FIG. 5A. A DC voltage offset has been subtracted from the negative coupled input signal 106n, which decreases an average voltage level of the negative coupled input signal 106n relative to FIG. 5A.

The right waveform includes both a positive conditioned differential input signal 118p and a negative conditioned differential input signal 118n. The voltage offset adjustment of the coupled input signal 106 also affects the offset between positive conditioned differential input signal 118p and the negative conditioned differential input signal 118n, thereby canceling out any inherent voltage offsets of the signal preconditioning circuit 110. The quality of the resulting conditioned differential input signal 118 is thus improved and results in a higher quality input to the decision circuit 130. In some embodiments, the right waveform may represent the equalized differential signal 804 from FIG. 8 after the DFE summation 802.

Figure 4:
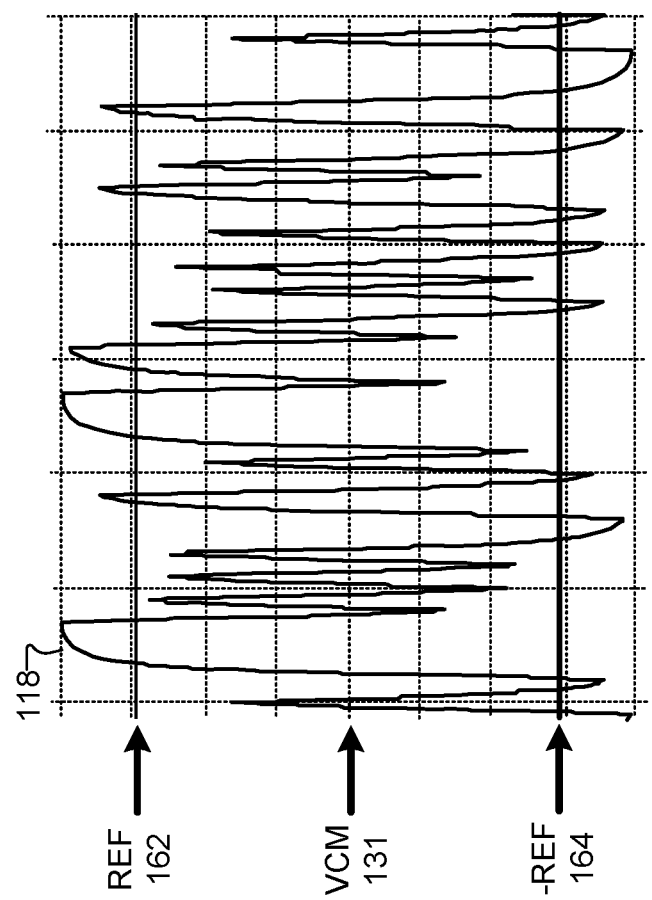
FIG. 4 is a waveform illustrating reference voltages of the receiver of FIG. 1, according to an embodiment of the present disclosure.

FIG. 4 is a waveform illustrating reference voltages of the receiver of FIG. 1, according to an embodiment of the present disclosure. The figures include signal plots of a conditioned differential signal 118, and differential reference signals 162 and 164. The waveform for conditioned differential signal 118 represents the voltage difference between positive signal 118p and negative signal 118n. The X axis represents time and the Y axis represents voltage.

When differential input signal 118 has a higher voltage than differential reference signal 162, error signal 122 will be logic high. When differential input signal 118 has a lower voltage than differential reference signal 162, error signal 122 will be logic low.

When differential input signal 118 is higher than differential reference 164, error signal 126 will be logic high. When differential input signal 118 is lower than differential reference 164, error signal 126 will be logic low.

The calibration circuit 140 adjusts differential reference signals 162 and 164 in an attempt to set the differential reference signals 162 and 164 to an average amplitude of the conditioned input signal 118. The adjustment of the reference signals 162 and 164 in conjunction with adjustment of the voltage offset and VGA gain allows the comparators 120, 124 and decision circuit 130 to operate within their optimal dynamic range. The use of two reference signals 162 and 164 also allows the feedback circuitry to analyze both the positive and negative amplitudes of the conditioned differential signal 118 to adjust for the signal 118 being too high or too low.

Figure 5:
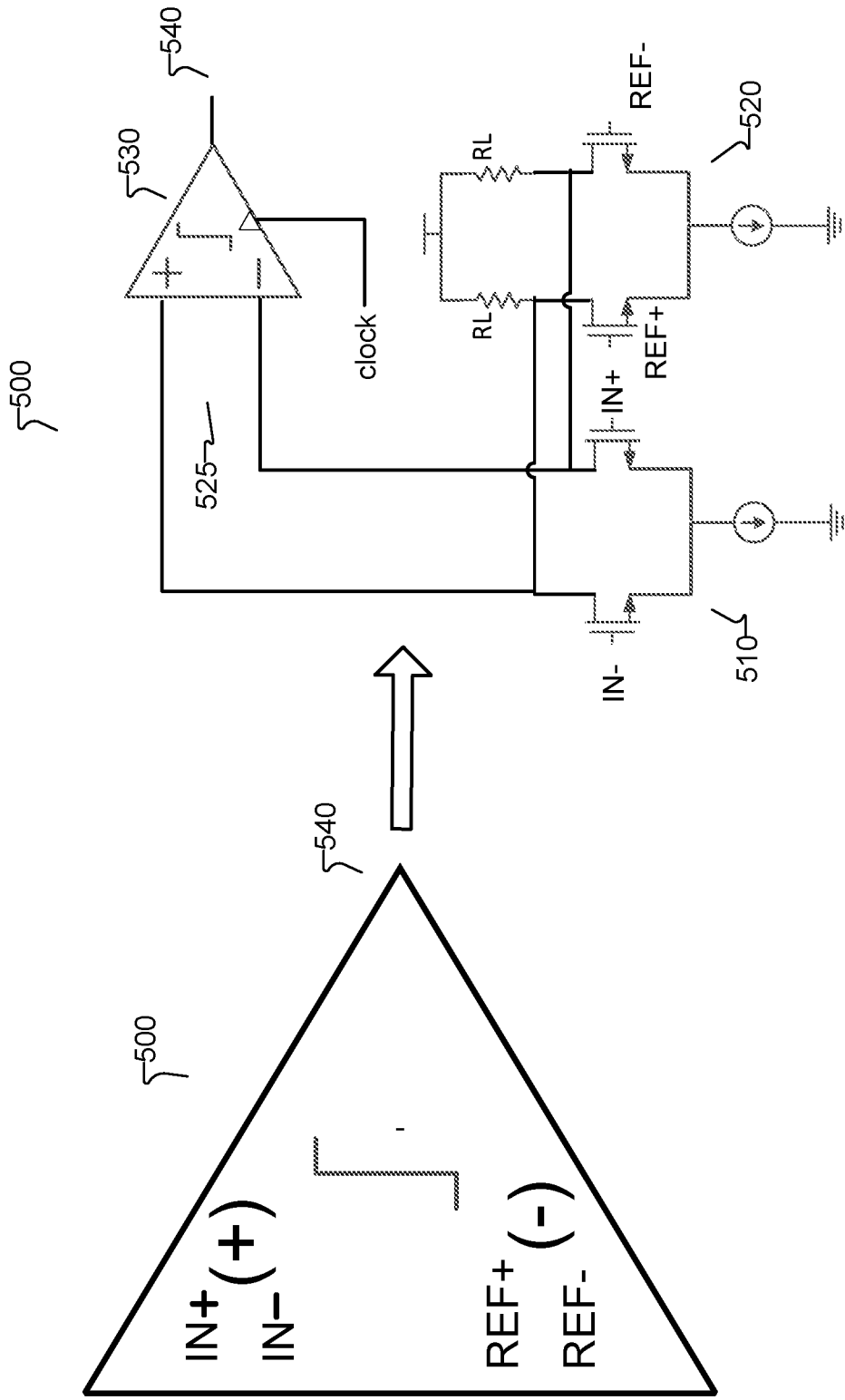
FIG. 5 is a comparator from the receiver of FIG. 1, according to an embodiment of the present disclosure.

FIG. 5 is a differential comparator 500, according to an embodiment of the present disclosure. Differential comparator 500 can represent the error comparators 120, 124 or the data decision circuit 130 from FIG. 1. In some embodiments, differential comparator 300 may also be referred to as a data slicer.

Differential comparator 500 includes two differential input pairs. The positive differential input pair (+) includes differential signals IN+ and IN−. The negative differential input pair (−) includes differential signals REF+ and REF−. The differential comparator 500 generates a single ended binary output indicating whether the positive differential input pair (+) is greater than or less than the negative differential input pair (−).

The right side of FIG. 1 includes a circuit diagram for the differential comparator 500. Differential comparator 500 includes a long tailed differential amplifier 310 that amplifies differential signals IN+ and IN−. Differential comparator 500 also includes another long tailed differential amplifier 520 that amplifies differential signals REF+ and REF−. Both amplifiers share the same load resistors RL.

The outputs of the amplifiers 510 and 520 are combined to generate a combined differential signal 525. The outputs of the amplifiers 510 and 520 are cross-wired such that combined differential signal 525 is approximately equal to the positive differential input pair (+) minus the negative differential input pair (−). Comparator 530 then compares the individual signals of the combined differential signal 525 with each other to generate the single ended output signal 540. Comparator 530 also acts as a latch to store and update the output signal 540 under control of a clock signal.

Referring back to FIG. 1, the operation of the calibration circuit 140 in updating the reference setting 144, the gain setting 146, and the offset setting 148 is now explained in detail. Calibration circuit 140 uses clocked adaptive feedback running continuously to concurrently update the reference setting 144, gain setting 146, and offset setting 148.

At each clock edge, the calibration circuit 140 computes four calibration parameters:

$$pup = !errorP \cdot data \qquad (eq1)$$

$$pdn = errorP \cdot data \qquad (eq2)$$

$$nup = errorN \cdot !data \qquad (eq3)$$

$$ndn = !errorN \cdot !data \qquad (eq4)$$

The pup parameter is calculated as a logical AND of the negation of error signal 122 (errorP) and the recovered data 132. The pdn parameter is calculated as a logical AND of error signal 122 (errorP) and the recovered data 132. The pup and pdn parameters indicate, when the recovered data is a logical 1, whether conditioned differential signal 118 is below or above the reference signal 162 (REF).

The nup parameter is calculated as a logical AND of error signal 126 (errorN) and the logical negation of recovered data 132. The ndn parameter is calculated as a logical AND of the logical negation of error signal 126 (errorN) and the logical negation of recovered data 132. The nup and ndn parameters indicate, when the recovered data is a logical 0, whether conditioned differential signal 118 is above or below the reference signal 164 (−REF).

A gain accumulator counter accGain and an offset accumulator counter accOffCal) are then updated according to the following equations:

$$accGain[k] = accGain[k-1] - pup + pdn - nup + ndn \quad (eq5)$$

$$accOffCal[k] = accOffcal[k-1] + pup - pdn - nup + ndn \quad (eq6)$$

In equation 5, the old value of accGain at sample time k−1 is combined with the pup, pdn, nup, and ndn parameters to calculate the new value of accGain at sample time k. The gain accumulator value provides an indication of whether a gain or reference adjustment is needed so the average amplitude of the differential signal 118 will better match reference signals 162 and 164.

In equation 6, the old value of accOffCal at sample time k−1 is combined with the pup, pdn, nup, and ndn parameters to calculate the new value of accOffCal at sample time k. The offset accumulator value provides an indication of whether an offset adjustment is needed in order for the differential signal 118 to be centered with respect to the reference signals 162 and 164, i.e. A0 and −A0.

accGain is compared to a small threshold labeled as bandwdGain that controls the bandwidth of the gain loop. accOffCal is compared to a larger threshold labeled as bandwdOffCal that controls the bandwidth of the offset loop. For example, the offset bandwidth threshold can be sixteen times greater than the gain bandwidth threshold. Both of the bandwidth thresholds are programmable.

The following pseudocode describes operation of the calibration circuit 140 in a hardware description language. Portions of the pseudocode will later be explained in greater detail by reference to FIGS. 6 and 7.

```
01  analog begin
02
03      @(initial_step) begin
04          accGain_val=accGain_int;
05          accOffCal_val=accOffCal_int;
06          A0_val=A0_int;
07          gainVGA_val=gainVGA_int;
08          voff_val=voff_int;
09      end
10
11      @(cross(V(clk)−vtrans_clk,0)) begin // clock falling edge
12          accGain_val_pre=accGain_val;
13          accOffCal_val_pre=accOffCal_val;
14          A0_val_pre=A0_val;
15          gainVGA_val_pre=gainVGA_val;
16          voff_val_pre=voff_val;
17
18          x= V(data)> vtrans;
19          pup = (V(error)< vtrans)*x;
20          pdn = (V(error)> vtrans)*x;
21          nup = (V(errorB)> vtrans)*!x;
22          ndn = (V(errorB)< vtrans)*!x;
23
24          accGain_val=accGain_val_pre − pup + pdn − nup + ndn;
25          accOffCal_val=accOffCal_val_pre + pup − pdn + ndn − nup;
26
27          if (accGain_val > bandwdGain) begin // Gain and Ref Calibration
28              A0_val=A0_val_pre + A0_step;
29              if (A0_val>A0_max) begin
30                  gainVGA_val=gainVGA_val_pre − gainVGA_step;
31                  A0_val=A0_int;
32                  if (gainVGA_val<gainVGA_min) begin
33                      gainVGA_val=gainVGA_min;
34                      A0_val=A0_val_pre;
35                  end
36              end
37              accGain_val=accGain_int;
38          end
39
40          if (accGain_val < neg_bandwdGain) begin
41              A0_val=A0_val_pre − A0_step;
42              if (A0_val<A0_min) begin
43                  gainVGA_val=gainVGA_val_pre + gainVGA_step;
44                  A0_val=A0_int;
45                  if (gainVGA_val>gainVGA_max) begin
46                      gainVGA_val=gainVGA_max;
47                      A0_val=A0_val_pre;
48                  end
49              end
50              accGain_val=accGain_int;
51          end
52
53          if (accOffCal_val > bandwdOffCal) begin   // Offset Calibration
54              voff_val=voff_val_pre + voff_step;
55              if (voff_val>voff_max) begin
56                  voff_val=voff_max;
57              end
58              accOffCal_val=accOffCal_int;
59          end
60
61          if (accOffCal_val < neg_bandwdOffCal) begin
62              voff_val=voff_val_pre − voff_step;
63              if (voff_val<voff_min) begin
64                  voff_val=voff_min;
65              end
66              accOffCal_val=accOffCal_int;
67          end
68      end
69
70  end //analog begin
```

In lines 03-09, certain variables and settings are initialized to their initial values. A0_val represents the reference setting 144, gainVGA_Val represents the gain setting 146 and voff_val represents the offset setting 148. accGain_val represents the value of the gain accumulator and accOff_val represents the value of the offset accumulator.

In lines 18-22, the calibration parameters (pup, pdn, nup, and ndn) are calculated. In lines 24-25, the gain accumulator value accGain_val and offset accumulator value accOff_val are updated using the calibration parameters.

In lines 27-51, the gain accumulator value accGain is compared to gain bandwidth thresholds (bandwdGain and neg_bandwdGain) in order to update the gain setting 146 (gainVGA_val) and reference setting 144 (A0_val).

In lines 53-68, the offset accumulator value accOffset is compared to offset bandwidth thresholds (bandwdOffCal and neg_bandwdOffCal) in order to update the offset setting 148 (voff_val).

Figure 6:
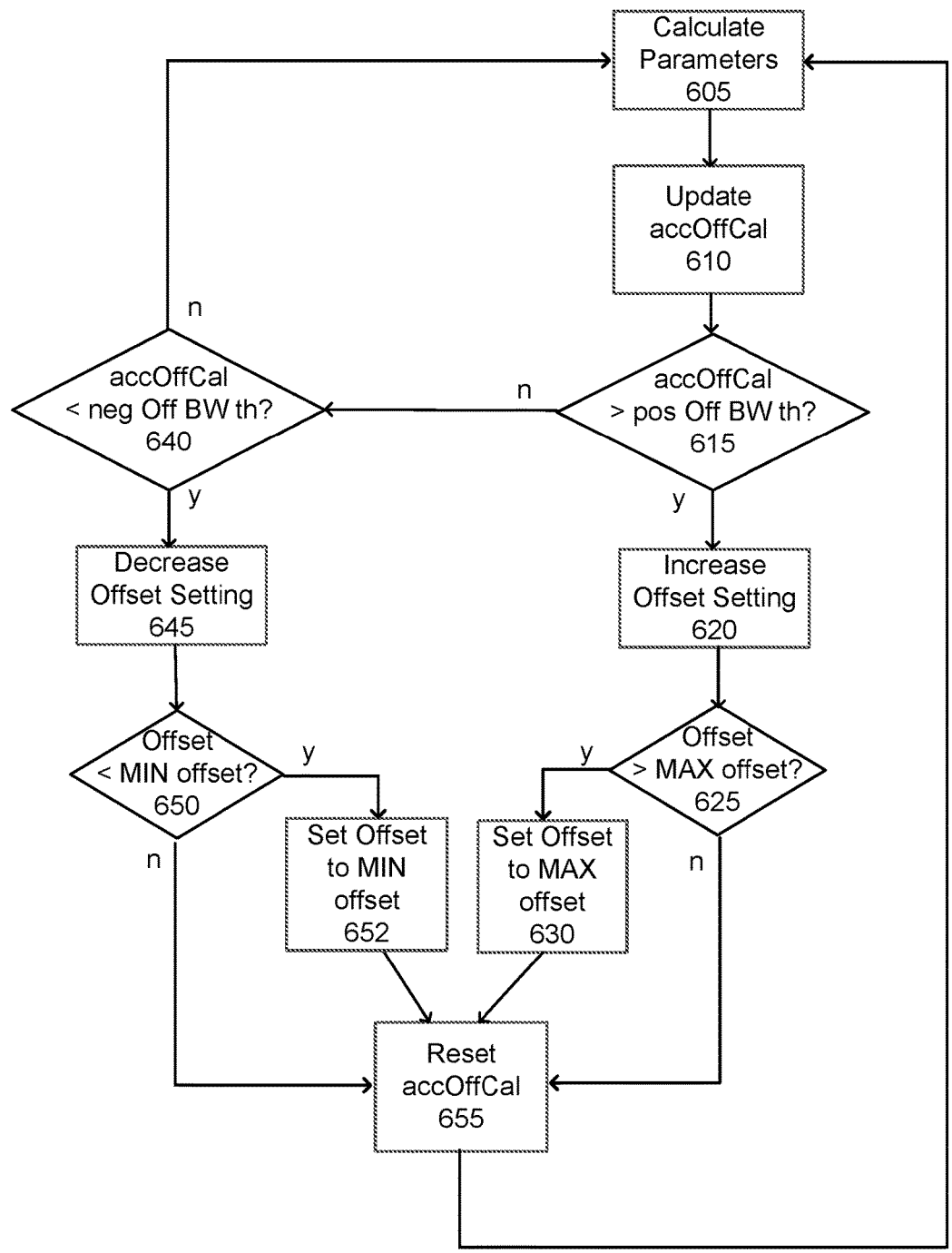
FIG. 6 is a flowchart illustrating operation of the calibration circuit during offset calibration, according to an embodiment of the present disclosure.
Figure 7:
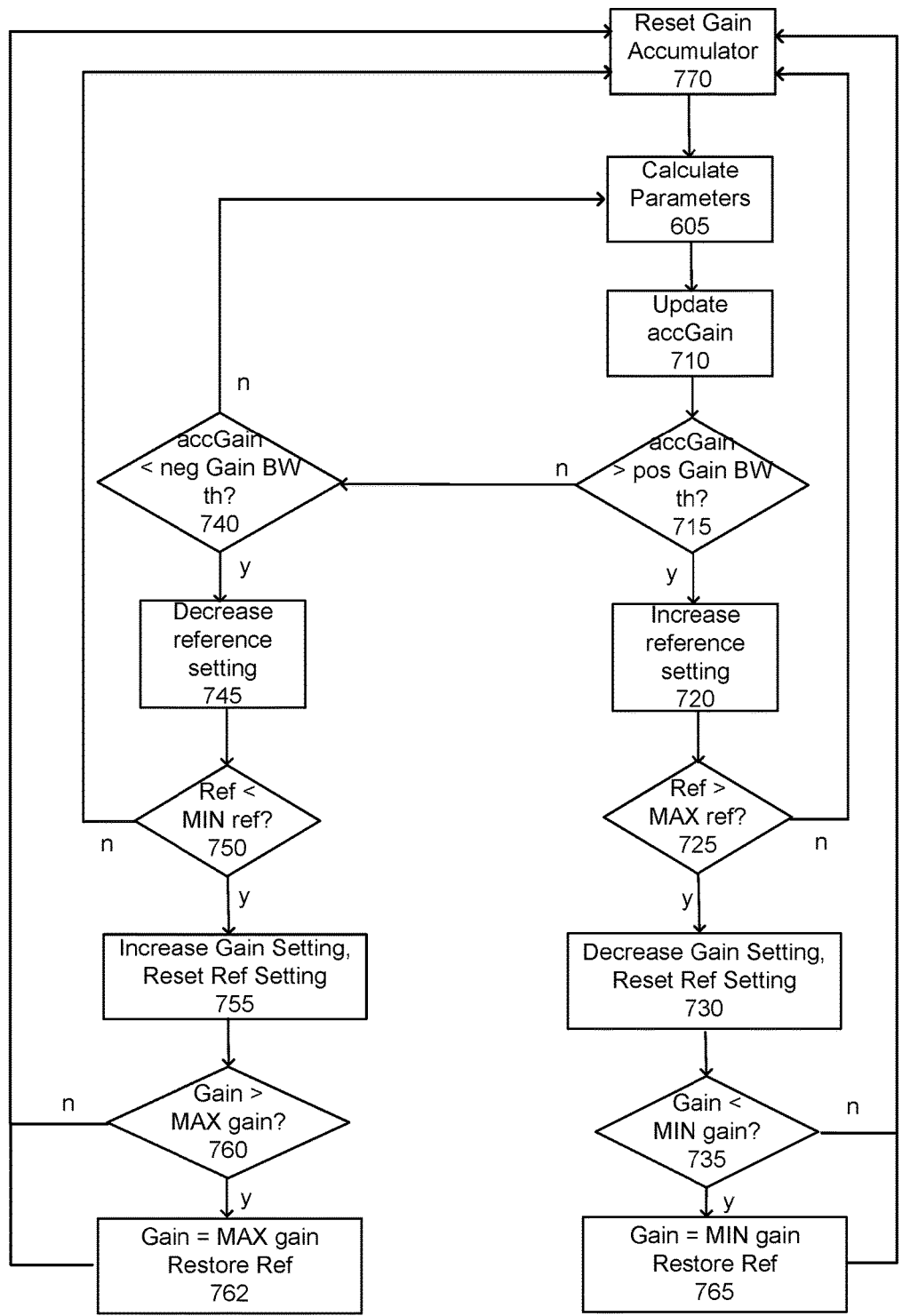
FIG. 7 is a flowchart illustrating operation of the calibration circuit during gain and reference calibration, according to an embodiment of the present disclosure.

Portions of the pseudocode are now explained in greater detail by reference to FIGS. 6 and 7. FIG. 6 is a flowchart illustrating operation of the calibration circuit during offset calibration, according to an embodiment of the present disclosure. FIG. 7 is a flowchart illustrating operation of the calibration circuit during gain and reference calibration, according to an embodiment of the present disclosure.

The processes shown in FIGS. 6 and 7 occur concurrently with each other but are shown in separate figures for ease of explanation. In each clock cycle the calibration circuit 140 can attempt to update the reference setting 144, gain setting 146, and offset setting 148. Changes to these settings can be used to fine tune the receiver 100 through the reference control signals 154, gain control signals 156 or offset control signals 158. The process shown in FIGS. 6 and 7 repeat periodically, such as at every clock edge.

Referring first to FIG. 6, in step 605, calibration parameters (pup, pdn, nup, ndn) are calculated according to equations 1-4. In step 610, an offset accumulator value (accOffCal) is updated. according to equation 6.

In step 615, the offset accumulator value is compared to a positive offset bandwidth threshold (e.g., +16384). If the positive threshold is exceeded, in step 620 the offset setting 148 is increased by a step.

In step 625, the offset setting 148 is compared to a pre-determined maximum offset value. In step 630, if the offset setting 148 is greater than the maximum offset value, the offset setting 148 is set to the maximum value since the maximum should not be exceeded. In step 655, the offset accumulator value is reset to its initial value and control returns to step 605.

In step 640, the offset accumulator value is compared to a negative offset bandwidth threshold (e.g., −16384). If the offset accumulator value is greater than or equal to the negative threshold, the process returns to step 605. In step 645, if the offset accumulator value is less than the negative threshold, the offset setting 148 is decreased by a step.

In step 650, the offset setting 148 is compared to a pre-determined minimum offset value. In step 652, if the offset setting 148 is less than the minimum offset setting, the offset setting 148 is set to the minimum value. In step 655, the offset accumulator value is reset its initial value and control returns to step 605.

Referring now to FIG. 7, in step 605, four different calibration parameters (pup, pdn, nup, ndn) are determined according to equations 1-4. In step 710, a gain accumulator value (accGain) is updated according to equation 5.

In step 715, the gain accumulator value is compared to a positive gain bandwidth threshold (e.g., +1024). In step 720, if the positive gain bandwidth threshold is exceeded, the reference setting 144 is increased.

In step 725, the reference setting 144 is compared to a pre-determined maximum reference setting. In step 730, if the reference setting 144 is greater than the maximum reference setting, the gain setting 146 is decreased by a step and the reference setting 144 is reset to an initial reset value. Alternatively, in step 770, if the reference setting 144 is not equal to the maximum reference setting, the gain accumulator value is reset to its initial reset value and control returns to step 705.

In step 735, the gain setting 146 is compared to a pre-determined minimum gain setting. In step 765, if the gain setting is less than the minimum gain setting, the gain setting 146 is set to the minimum gain setting and the reference setting 144 is restored to the value before step 720 occurred. In other words, reference setting 144 and gain setting 146 are maintained at the values they had before steps 720-730 were performed because no change is possible. In step 770, the gain accumulator value is reset and control returns to step 605.

In step 740, the gain accumulator value is compared to a negative gain bandwidth threshold (e.g., −1024). If the gain accumulator value is greater than or equal to the negative gain bandwidth threshold, the process returns to step 605. If the gain accumulator value is less than the negative threshold, the reference setting 144 is decreased in step 745.

In step 750, the reference setting is compared to a pre-determined minimum reference setting. In step 755, if the reference setting 144 is less than the minimum reference setting, the gain setting 146 is increased and the reference setting 144 is reset to its initial value. Alternatively, in step 750, if the reference setting 144 is less than the minimum reference setting, the gain accumulator value is reset in step 770 and control returns to step 605.

In step 760, the gain setting 146 is compared to a pre-determined maximum gain setting. In step 762, if the gain setting 146 is greater than the pre-determined maximum gain setting, gain setting 146 is set to the maximum gain setting and the reference setting 144 is restored to the value before step 745 occurred. In other words, reference setting 144 and gain setting 146 are maintained at the values they had before steps 745-755 were performed because no change is possible. In step 770, the gain accumulator value is reset and control returns to step 705.

Figure 8:
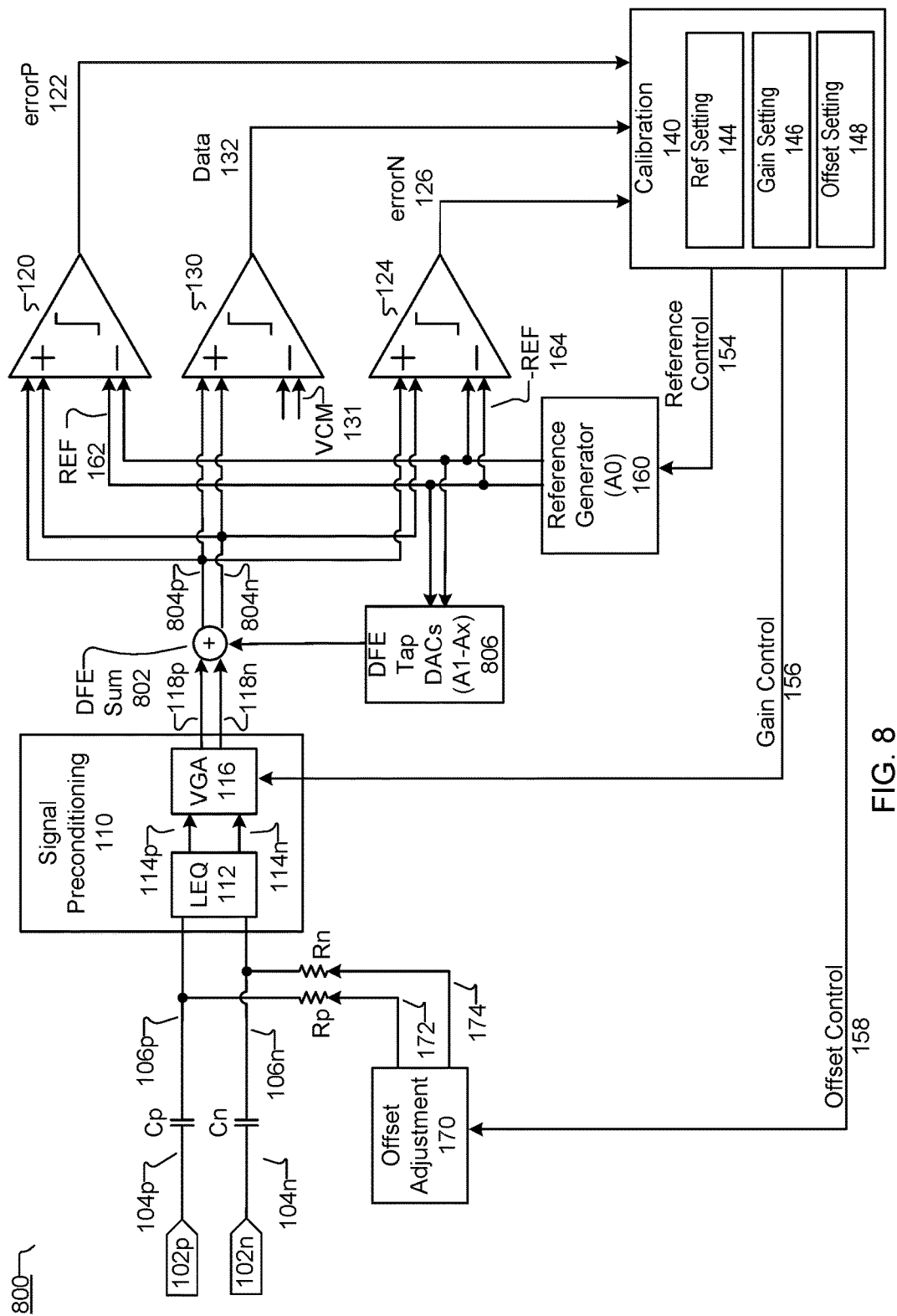
FIG. 8 is a receiver with offset calibration, according to another embodiment of the present disclosure.

FIG. 8 is a receiver 800 with offset calibration, according to another embodiment of the present disclosure. The receiver 800 of FIG. 8 is similar to the receiver 100 of FIG. 1. Thus, the description of the previous figures also applies to the receiver 800 of FIG. 8. However, the receiver 800 now includes a decision feedback equalizer (DFE) that is comprised of DFE summer circuit 802, DFE tap digital to analog converters (DACs) circuit 806, and decision circuit 130.

DFE summer 802 receives conditioned differential input signal 118 and combines the conditioned differential input signal 118 with feedback from the DFE tap DACs circuit 806 to generate a decision equalized differential input signal 804 (including 804p and 804n) at output nodes of the DFE summer 802. Decision equalized differential input signal 804 is another example of an input signal derived from the coupled differential input signal 106. DFE tap DACs circuit 806 adjusts its DFE tap weighting relative to the differential reference signal 162. Thus, the feedback loop circuitry can also adjust the DFE tap voltages, via reference control signal 154 and differential reference signal 162, based on the error signals 126 and 122 and the recovered data 132. In some embodiments, the tap weighting of DFE tap DACs circuit 806 may be controlled directly through reference control signal 154 instead of through differential reference signal 162.

The decision circuit 130 is a data slicer that makes a decision on the data represented by decision equalized differential input signal 804, thereby generating recovered data 132.

Error comparator 120 compares decision equalized differential signal 804 to positive differential reference signal 162 (REF). Error comparator 120 outputs an error signal 122 (errorP) having a binary value indicating whether the differential voltage level of decision equalized differential input signal 804 is greater than or less than the differential voltage level of differential reference signal 162.

Error comparator 124 compares the decision equalized differential input signal 804 to a negative differential reference signal 164 (−REF). Error comparator 124 outputs an error signal 126 (errorN) having a binary value indicating whether a differential voltage level of decision equalized differential signal 804 is greater than or less than the differential voltage level of differential reference signal 164.

Figure 9:
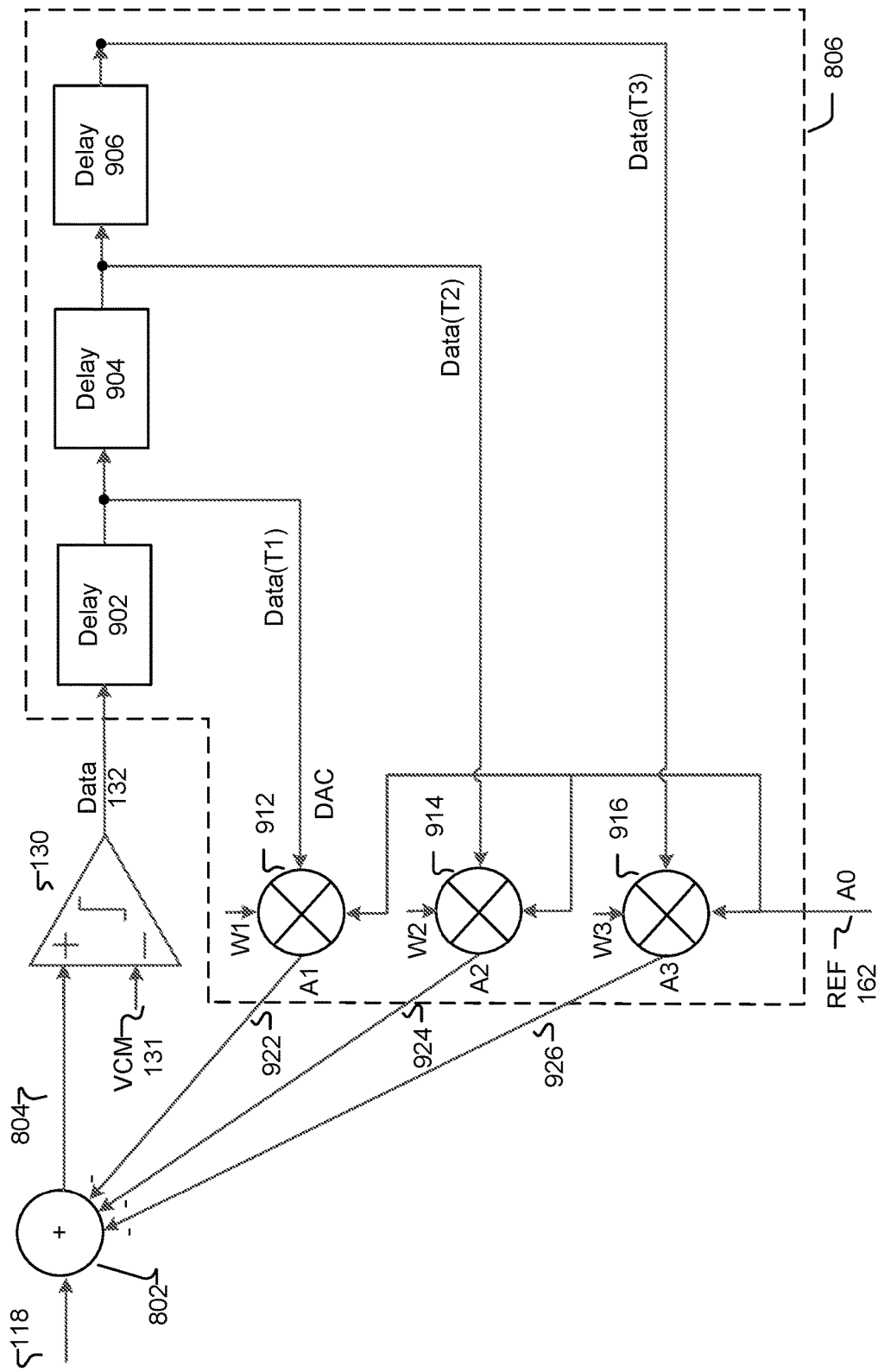
FIG. 9 is a decision feedback equalizer from the receiver of FIG. 8, according to an embodiment of the present disclosure.

FIG. 9 is a decision feedback equalizer from the receiver of FIG. 8, according to another embodiment of the present disclosure. For ease of explanation, both differential and single ended signals are shown with single lines in FIG. 9.

The DFE includes DFE summing circuit 802, decision circuit 130, and DFE tap DACs circuit 806. DFE tap DACs circuit 806 includes multiple delay circuits, such as three delay circuits 902, 904 and 906, to delay the recovered data 132. The output of delay circuit 902 is one feedback tap, the output of delay circuit 904 is another feedback tap, and the output of delay circuit 906 is another feedback tap.

Tap weighting circuits 912, 914 and 916 weight the delayed data of each feedback tap by a tap weight W1, W2 and W3 and output weighted feedback signals 922, 924 and 926. In one embodiment, weighting circuits 912, 914 and 916 may be gain adjustable digital to analog converters that convert the delayed data at each feedback tap into analog voltages. The value (e.g. weighting) of each feedback tap is also adjusted by reference signal 162. The change in the voltage level of reference signal 162 may be directly proportional to the change in the value applied by the tap weighting circuits 912, 914 and 916. For example, if the voltage level of reference signal 162 increases by 50%, the value of all the feedback taps may also increase by 50%.

Summing circuit 802 subtracts the weighted feedback signals 922, 924 and 926 from the conditioned input signal 118. The summing circuit 802 then outputs a decision equalized signal 804 resulting from the combination of the weighted feedback signals 922, 924 and 926 and conditioned input signal 118.

In one embodiment, a representation of circuits within the receiver 100 or 800 may be stored as data in a non-transitory computer-readable medium (e.g. hard disk drive, flash drive, optical drive). These representations may in the form of, for example, behavioral level descriptions, register transfer level descriptions, logic component level descriptions, transistor level descriptions or layout geometry-level descriptions.

Upon reading this disclosure, those of skill in the art may appreciate still additional alternative designs for a receiver with offset calibration. Thus, while particular embodiments and applications of the present disclosure have been illustrated and described, it is to be understood that the disclosure is not limited to the precise construction and components disclosed herein. Various modifications, changes and variations which may be apparent to those skilled in the art may be made in the arrangement, operation and details of the method and apparatus of the present disclosure herein without departing from the spirit and scope of the disclosure as defined in the appended claims.

What is claimed is:

1. A receiver comprising:
   alternating current (AC) coupling circuitry to couple a differential input signal into a coupled differential signal having a first signal and a second signal;
   a decision feedback equalizer circuit to generate a decision equalized signal;
   a first comparator circuit to compare a first reference signal to the decision equalized signal and to generate a first error signal at an output of the first comparator circuit;
   a second comparator circuit to compare a second reference signal to the decision equalized signal and to generate a second error signal at an output of the second comparator circuit; and
   feedback circuitry to adjust a voltage offset between the first signal and the second signal of the coupled differential signal based on the first error signal and the second error signal.

2. The receiver of claim 1, wherein the feedback circuitry comprises:
   a calibration circuit to generate an offset control signal based on the first error signal and the second error signal; and
   an offset adjustment circuit to adjust the voltage offset between the first signal and the second signal of the coupled differential signal based on the offset control signal.

3. The receiver of claim 2, wherein the feedback circuitry comprises:
   a first resistive element coupling a first output of the offset adjustment circuit to the first signal of the coupled differential signal; and
   a second resistive element coupling a second output of the offset adjustment circuit to the second signal of the coupled differential signal,
   wherein the offset adjustment circuit generates a first direct current (DC) voltage at the first output and a second DC voltage at the second output, and adjusts an offset between the first DC voltage and the second DC voltage based on the offset control signal.

4. The receiver of claim 1, further comprising:
   an analog front end circuit to generate a conditioned input signal from the coupled differential signal using a variable gain amplifier, the decision feedback equalizer to generate the decision equalized signal based on the conditioned input signal.

5. The receiver of claim 4, wherein the analog front end circuit generates the conditioned input signal using a variable gain amplifier, and the feedback circuitry further adjusts a gain of the variable gain amplifier based on the first error signal and the second error signal.

6. The receiver of claim 1, wherein the feedback circuitry adjusts the first reference signal and the second reference signal based on the first error signal and the second error signal.

7. The receiver of claim 1, wherein the first reference signal and the second reference signal have opposite polarity.

8. The receiver of claim 1, wherein the feedback circuitry further adjusts feedback tap weights of the decision feedback equalizer based on the first error signal and the second error signal.

9. The receiver of claim 1, further comprising:
   a data decision circuit to generate recovered data based on the decision equalized signal;
   wherein the feedback circuitry adjusts the voltage offset between the first signal and the second signal of the coupled differential signal further based on the recovered data.

10. The receiver of claim 9, wherein the feedback circuitry generates a calibration parameter based on a logical AND of the first error signal and the recovered data, and adjusts the voltage offset between the first signal and the second signal of the coupled differential signal based on the calibration parameter.

11. The receiver of claim 9, wherein the feedback circuitry generates a calibration parameter based on a logical AND of the first error signal and a logical negation of the recovered data, and adjusts the voltage offset between the first signal and the second signal of the coupled differential signal based on the calibration parameter.

12. The receiver of claim 9, wherein the feedback circuitry generates a calibration parameter based on a logical AND of a logical negation of the first error signal and the recovered data, and adjusts the voltage offset between the first signal and the second signal of the coupled differential signal based on the calibration parameter.

13. The receiver of claim 9, wherein the feedback circuitry generates a calibration parameter based on a logical AND of a logical negation of the first error signal and a logical negation of the recovered data, and adjusts the voltage offset between the first signal and the second signal of the coupled differential signal based on the calibration parameter.

14. The receiver of claim 1, wherein:
the first comparator circuit generates the first error signal to be indicative of whether a differential voltage of the first reference signal is greater or less than a differential voltage of the decision equalized signal, and
the second comparator circuit generates the second error signal to be indicative of whether a differential voltage of the second reference signal is greater or less than the differential voltage of the decision equalized signal.

15. A method of operation in a receiver, the method comprising:
alternating current (AC) coupling a differential input signal into a coupled differential signal, the coupled differential signal having a first signal and a second signal;
generating, with a decision feedback equalizer, a decision equalized signal;
comparing a first reference signal to the decision equalized signal to generate a first error signal indicative of whether the first reference signal is greater than or less than the decision equalized signal;
comparing a second reference signal to the decision equalized signal to generate a second error signal indicative of whether the second reference signal is greater than or less than the decision equalized signal; and
adjusting, with feedback, a voltage offset between the first signal and the second signal of the coupled differential signal based on the first error signal and the second error signal.

16. The method of claim 15, further comprising:
generating a conditioned input signal from the coupled differential signal using a variable gain amplifier, wherein the decision feedback equalizer receives the conditioned input signal and generates the decision equalized signal based on the conditioned input signal; and
adjusting a gain of the variable gain amplifier based on the first error signal and the second error signal.

17. The method of claim 15, further comprising:
adjusting the first reference signal and the second reference signal based on the first error signal and the second error signal.

18. The method of claim 15, further comprising:
adjusting a feedback tap weighting of the decision feedback equalizer based on the first error signal and the second error signal.

19. The method of claim 15, further comprising:
recovering data from the decision equalized signal; and
adjusting the voltage offset between the first signal and the second signal of the coupled differential signal further based on the recovered data.

20. The method of claim 15, wherein the first reference signal and the second reference signal have opposite polarity.

* * * * *